(12) United States Patent
Gui et al.

(10) Patent No.: US 11,925,944 B2
(45) Date of Patent: Mar. 12, 2024

(54) HIGH-ASH FINE COAL SLIME SEPARATION EQUIPMENT AND METHOD

(71) Applicant: CHINA UNIVERSITY OF MINING AND TECHNOLOGY, Jiangsu (CN)

(72) Inventors: Xiahui Gui, Jiangsu (CN); Yaowen Xing, Jiangsu (CN); Zili Yang, Jiangsu (CN); Yijun Cao, Jiangsu (CN); Jiongtian Liu, Jiangsu (CN); Lingyong Xia, Hebei (CN); Taishun Liu, Hebei (CN); Shunzeng Tong, Hebei (CN)

(73) Assignee: CHINA UNIVERSITY OF MINING AND TECHNOLOGY, Jiangsu (CN)

(*) Notice: Subject to any disclaimer, the term of this patent is extended or adjusted under 35 U.S.C. 154(b) by 710 days.

(21) Appl. No.: 17/252,741

(22) PCT Filed: Apr. 22, 2019

(86) PCT No.: PCT/CN2019/083660
§ 371 (c)(1),
(2) Date: Dec. 16, 2020

(87) PCT Pub. No.: WO2020/155420
PCT Pub. Date: Aug. 6, 2020

(65) Prior Publication Data
US 2021/0268518 A1 Sep. 2, 2021

(30) Foreign Application Priority Data
Jan. 31, 2019 (CN) .......................... 201910099623.1

(51) Int. Cl.
*B03D 1/02* (2006.01)
*B03D 1/24* (2006.01)

(52) U.S. Cl.
CPC ............. *B03D 1/028* (2013.01); *B03D 1/242* (2013.01)

(58) Field of Classification Search
None
See application file for complete search history.

(56) References Cited

FOREIGN PATENT DOCUMENTS

| CN | 105964414 | 9/2016 |
|----|-----------|--------|
| CN | 107537698 | 1/2018 |
| KR | 20000019397 | 4/2000 |

OTHER PUBLICATIONS

"International Search Report (Form PCT/ISA/210) of PCT/CN2019/083660", dated Aug. 21, 2019, with English translation thereof, pp. 1-4.

*Primary Examiner* — Peter Keyworth
(74) *Attorney, Agent, or Firm* — JCIP GLOBAL INC.

(57) ABSTRACT

Disclosed is high-ash fine coal slime separation equipment and method, applicable to the field of coal washing. The high-ash fine coal slime separation equipment includes a feeding system (1), a mineralization system (2), a separation system (3) and a pulsating water flow control system (4). A coal slime mineralization region is isolated from a separation region; and a damping block and a pulsating water flow device are arranged in a mineral separation system. A flotation feeding is fed into the feeding system (1), slurry mixing operation is completed, coal slime enters the mineralization system after pulp mixing to generate turbulent collision to form mineralized bubbles, the mineralized bubbles enters the separation system (3) after passing through a turbulent-flow dissipation pipe (12), and meanwhile, pulsating water flow with a certain frequency and waveform is fed into the separation system (3) by the pulsating water flow control system (4).

6 Claims, 3 Drawing Sheets

HIGH-ASH FINE COAL SLIME SEPARATION EQUIPMENT AND METHOD

CROSS-REFERENCE TO RELATED APPLICATION

This application is a 371 of international application of PCT application serial no. PCT/CN2019/083660, filed on Apr. 22, 2019, which claims the priority benefit of China application no. 201910099623.1, filed on Jan. 31, 2019. The entirety of each of the above mentioned patent applications is hereby incorporated by reference herein and made a part of this specification.

TECHNICAL FIELD

The present invention relates to high-ash fine coal slime separation equipment and method, and in particular, to high-ash fine coal slime separation equipment and method applicable to the technical field of ore flotation.

BACKGROUND

In recent years, with the increase of the coal mining mechanization degree and deterioration the geological condition of the coal field, the coal slime content and the ash content are getting higher and higher, the particle size is getting finer and finer, and the coal slime separation is characterized by "fine, miscellaneous and difficult". The increase of the ash content of the coal slime increases the content of high-ash fine slime which easily enters the foam layer with the water flow to form inclusions, resulting in that the ash content of the clean ash is increased continuously and the flotation selectivity is lowered, which becomes the bottleneck restricting the quality of the clean coal product. On the other hand, the particle size of the coal slime decreases, the micro-fine particle content increases, the collision probability of the coal slime and the bubbles in the flotation process is low, and the coal slime is difficult to adhere to the surfaces of bubbles, resulting in low recovery rate of the coal slime. Therefore, the separation of the coal slime encounters the double contradiction of selectivity and recovery rate.

In the aspect of the coal slime separation equipment, the "static" separation environment of the existing column separation equipment and the large ash content gradient generated by the thick foam layer have obvious effects on the ash reduction of the coal slime. In the column separation equipment, the thick foam layer has a certain effect of filtering out fine slime entrained in the clean coal along with water flow and is an important barrier to reduce "mechanical inclusion". However, in industrial practice, column type separation also reflects low ash content of tail coal and low separation efficiency, especially the property defects such as poor recovery effect on coarse particles, low fluctuation resistance and the like.

Compared with the column separation equipment, the groove type separation equipment has the prominent advantages of high interference resistance in the production process, strong turbulent flow, low foam layer and high capability of recovering the coarse particles. The groove type separation equipment has the disadvantages as follows: the flotation tank body is shallow, the clean coal foam layer is thin (200 mm to 300 mm), there is no foam concentration process, the ash content of the clean coal is usually high, and secondary concentration is generally required to efficiently separate the high-ash coal difficult to separate; and the foam is forcibly scraped mechanically intermittently, the content of the high-ash fine slime entrained in the foam is high, separation is conducted tank by tank, and the ore pulp forms a significant ash gradient. With the increase of the flotation time, the ash content increases and the "mechanical inclusion" becomes serious. In the aspect of forcible recovery, the groove type separation equipment can ensure recovery of the micro-fine ore only with efficient energy transfer and powerful mineral condition.

Therefore, according to the characteristics that the "static" separation environment of the column type separation equipment has high selectivity on separation and the "strong turbulent flow" mineralization environment of the groove type separation equipment has strong recovery on separation, it is of great significance to develop novel coal slime efficient recovery equipment.

SUMMARY OF THE INVENTION

Technical problem: to overcome the defects in the existing separation equipment, the prevent invention provides a high-ash fine coal slime separation method and equipment; and to overcome the defects and disadvantages of the existing equipment, the present invention provides high-ash fine coal slime separation equipment with advanced principle, operation stability, high treatment capacity and high selectivity, and a separation method by introducing a damping pulsating separation technology into the separation link of the flotation column.

Technical solution: to achieve the above equipment objective, the high-ash fine coal slime separation equipment according to the present invention includes a feeding system, a mineralization system, a separation system and a pulsating water flow control system which are connected sequentially through pipelines, wherein the feeding system includes a stirring barrel with a stirring motor, wherein materials at a discharging port at the bottom of the stirring barrel are pressurized by a pump to be fed into the mineralization system;

the mineralization system includes a bubble generator, a mineralization chamber and a turbulent-flow dissipation pipe, wherein an inlet of the bubble generator is connected to an outlet pipeline of the pump, and an outlet of the bubble generator is connected to a feeding port below the mineralization chamber;

the separation system includes a damping pulsating water flow type flotation column and an air compressor, wherein the damping pulsating water flow type flotation column is of a columnar structure, an air inlet connected to an outlet of the air compressor is formed at the bottom of the damping pulsating water flow type flotation column, and a clean coal overflow tank is arranged at the top of the damping pulsating water flow type flotation column; and the pulsating water flow control system includes a water tank, a variable-frequency pump, a proportion integration differentiation (PID) control cabinet and a pressure gauge, wherein a water outlet of the water tank is connected to an inlet of the variable-frequency pump, an outlet of the variable-frequency pump is connected to the separation system through a pipeline, the pressure gauge is arranged on a pipeline between the variable-frequency pump and the separation system, and the PID control cabinet is in circuit connection to the variable-frequency pump and controls work of the variable-frequency pump;

wherein, the damping pulsating water flow type flotation column is of a column-structure and is internally divided into a clean coal concentration region, an active pulse flow region, a damping pulsation region, an air flotation scavenging region and an inflation chamber, wherein the clean coal concentration region is the clean coal overflow tank arranged at the top end of the columnar structure, the active pulse flow region includes an annular pulsating water flow pipe surrounding the damping pulsating water flow type flotation column, the annular pulsating water flow pipe is provided with a plurality of jet orifices to enable clean water to uniformly wash a foam layer in the separation process so as to effectively reduce mechanical covering phenomenon and reduce the ash content of clean coal, a flotation column feeding port is formed in a connecting portion of the damping pulsation region and the air flotation scavenging region, the damping pulsation region is provided with a plurality of damping blocks on an inner side wall of the damping pulsating water flow type flotation column, the damping blocks are of triangular structures and are uniformly arranged at the periphery of the damping pulsation region in a shell of the damping pulsating water flow type flotation column, an upper part of the air flotation scavenging region is provided with a flotation assisted baffle inclining downwards at a position of a surface opposite to the flotation column feeding port, the flotation assisted baffle prevents ore pulp from entering the damping pulsating water flow type flotation column to directly collide with the opposite column wall so as to reduce the desorption probability of coarse particles and improve flotation stability, an lower part of the air flotation scavenging region (D) is provided with a tail coal opening on a side wall, the bottom of the inflation chamber is connected to an inlet of the air compressor, and one or more layers of microporous ceramic plates are arranged between the top of the inflation chamber and the air flotation scavenging region.

An included angle between the flotation assisted baffle and the damping pulsating water flow type flotation column is 15° to 60°.

The microporous ceramic plate has a pore diameter of 5 μm to 100 μm; and in the separation process, the microporous ceramic plate generates a large number of microbubbles by input air and prevents an ore pulp solution in the damping pulsating water flow type flotation column from entering the air compressor.

A cylinder body of the mineralization chamber is a cyclone shell, multiple layers of damping disks are arranged in the mineralization chamber, a feeding port tangent to the mineralization chamber is formed in a middle lower part of the mineralization chamber, an accident discharging pipe with a control valve is arranged on a lower part of the mineralization chamber, and a mineralization chamber discharging port tangent to the mineralization chamber is formed in an upper part of the mineralization chamber.

A turbulent-flow dissipation pipe is arranged between the mineralization chamber discharging port of the mineralization chamber and the flotation column feeding port of the damping pulsating water flow type flotation column, the turbulent-flow dissipation pipe internally comprises a plurality of steel pipes, the steel pipes are welded into a bundle in pairs, a cross section of the bundle is quasi-circular, and each of the steel pipes has a diameter of 5 mm to 6 mm and a length of 15 mm to 25 mm.

A high-ash fine coal slime separation method includes the following steps:
a. starting the air compressor and inflating the damping pulsating water flow type flotation column through the microporous ceramic plate; starting the variable-frequency pump and adjusting a frequency of the variable-frequency pump by the PID control cabinet so as to adjust a pulsating water flow frequency and an amplitude: the higher the content of high ash in the coal slime is, the greater the pulsating water frequency and the amplitude are, on the contrary, the smaller the pulsating water flow frequency and the amplitude; closing the accident discharging pipe of the mineralization chamber;
b. feeding flotation coal slime and medicaments into the stirring barrel to mix uniformly to generate an ore pulp mixture, feeding the ore pulp into the bubble generator under the effect of the pump, enabling the ore pulp mixture to suck air under a negative pressure generated under the jet flow action of the bubble generator and crushing the air to be mixed into the ore pulp mixture to form jet ore pulp;
c. enabling the jet ore pulp to continuously move downwards to the mineralization chamber, generating a strong turbulent flow effect under the action of a centrifugal force field of the mineralization chamber and the damping disk, performing efficient collision and adhesion between particles and bubbles in the jet ore pulp to form a gas-solid-liquid three-phase ore pulp body, discharging the three-phase ore pulp body from the mineralization chamber discharging port, enabling the discharged three-phase ore pulp body to enter the turbulent-flow dissipation pipe and then enter the damping pulsating water flow type flotation column from the flotation column feeding port after eliminating vortex in the three-phase ore pulp by a plurality of small steel pipes in the turbulent-flow dissipation pipe;
d. performing static separation after the three-phase ore pulp enters the damping pulsating water flow type flotation column, changing a flow velocity of the ore pulp when the ore pulp passes through the damping block, enabling one part of coarse clean coal in the ore pulp to successfully enter the active pulse flow region and the clean coal concentration region, and acting on a foam product generated in the three-phase ore pulp through pulsating water flow of the pulsating water flow pipe to remove high-ash materials in the foam product; taking particles in the three-phase ore pulp which are not mineralized and desorbed as coal particles difficult to separate to enter the air flotation scavenging region and performing secondary mineralization with microbubbles generated by the microporous ceramic plate to form a secondary mineralized foam product, thus enhancing recovery of the coal particles difficult to separate; and
e. finally enabling clean coal foam and coarse clean coal to overflow together to enter the clean coal overflow tank to be discharged, wherein mineralized particles and high-ash materials become underflow, and the underflow serves as the final tail coal to be discharged from the tail coal opening of the damping pulsating water flow type flotation column.

Beneficial Effects:
(1) The mineralization region and the separation region are isolated by the turbulent-flow dissipation pipe, so that turbulent collision and static separation are realized, and it is helpful to improve the recovery ability of coarse coal slime and fine coal slime difficult to float. The action of the centrifugal field of the mineralization chamber enhances the turbulence intensity of the ore pulp and increases the collision probability of particles and bubbles, so that the coal particles and the bubbles are subjected to cyclone mineralization; the mineralized particles eliminate large vortex inside by the turbulent-flow dissipation pipe to achieve flow stabilizing effect and enters the flotation column to realize static separation, and a sufficient suspension force is supported by the air compressor, thus reducing the desorption probability of the coarse particles.

(2) When the pulp passes through the damping block, pulsating water flow is provided by the pulsating water flow pipe to change the flow velocity, so that one part of coarse clean coal enters the active pulsation region and the clean coal concentration region successfully, and meanwhile, the mechanical inclusion phenomenon of the fine heavy product is reduced and the separation effect is effectively improved.

(3) The pulsation frequency and amplitude of the pulsating water flow may be adjusted, so that different materials obtain acceleration and deceleration effects, and the leading function of the density on the separation effect of the coarse coal slime is enhanced; and the foam is washed by the pulsating water flow, thereby forcibly reducing ash, improving selectivity and controlling the ash content of the clean coal.

(4) By the air flotation scavenging region arranged in the pulsating water flow type flotation column, secondary mineralization of the unmineralized and fallen coarse particles may be completed, the particles may naturally enter the static separation region with low turbulent flow to be mineralized with the microbubbles, so that the capture probability of the particles difficult to float is increased, thereby increasing the yield of the clean coal and the ash content of the tail coal.

(5) The equipment has the advantages of advanced principle, significant effects of reducing ash and improving quality, operation stability, high adaptability to the coal slime with different coal quality, good separation effect, high separation efficiency, low production and operation cost and significant economic benefit.

1—feeding system, 2—mineralization system, 3—separation system, 4—pulsating water flow control system, 5—stirring barrel, 6—pump, 7—bubble generator, 8—mineralization chamber feeding port, 9—damping disk, 10—mineralization chamber, 11—mineralization chamber discharging port, 12—turbulent-flow dissipation pipe, 13—steel pipe, 14—flotation column feeding port, 15—damping pulsating water flow type flotation column, 16—clean coal overflow tank, 17—pulsating water flow pipe, 18—pressure gauge, 19—variable-frequency pump, 20—water tank, 21—PID control cabinet, 22—damping block, 23—flotation assisted baffle, 24—tail coal opening, 25—microporous ceramic plate, 26—air inlet, 27—air compressor, 28—accident discharging pipe, A—clean coal concentration region, B—active pulsation region, C—damping pulsation region, D—air flotation scavenging region, E—inflation chamber.

DETAILED DESCRIPTION OF THE EMBODIMENTS

The specific implementations of the present invention are further described in detail below with reference to the drawings.

Figure 1:
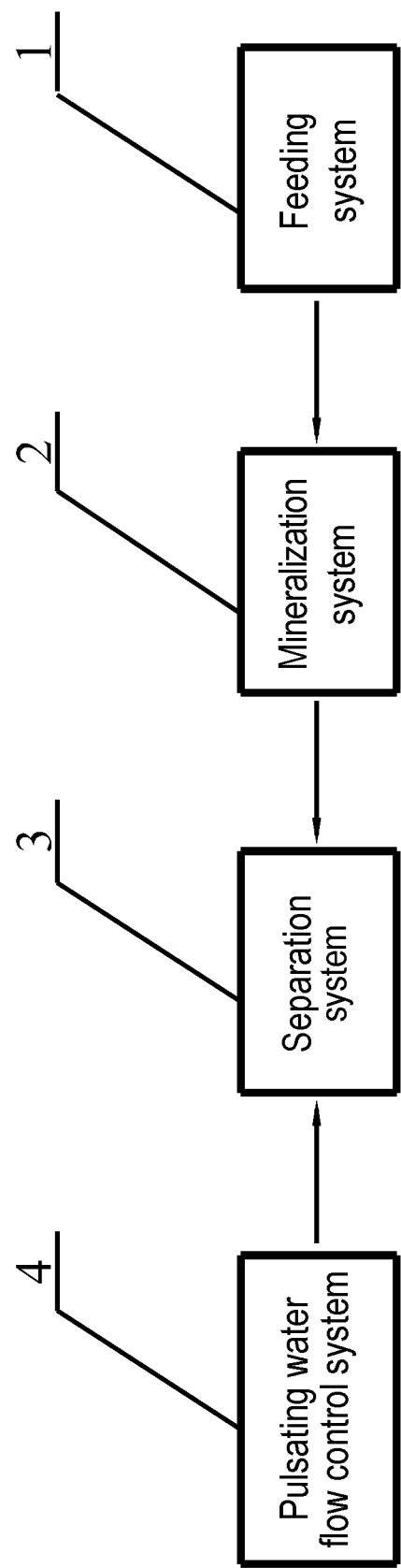
FIG. 1 is a schematic diagram of high-ash fine coal slime separation equipment according to the present invention.
Figure 2:
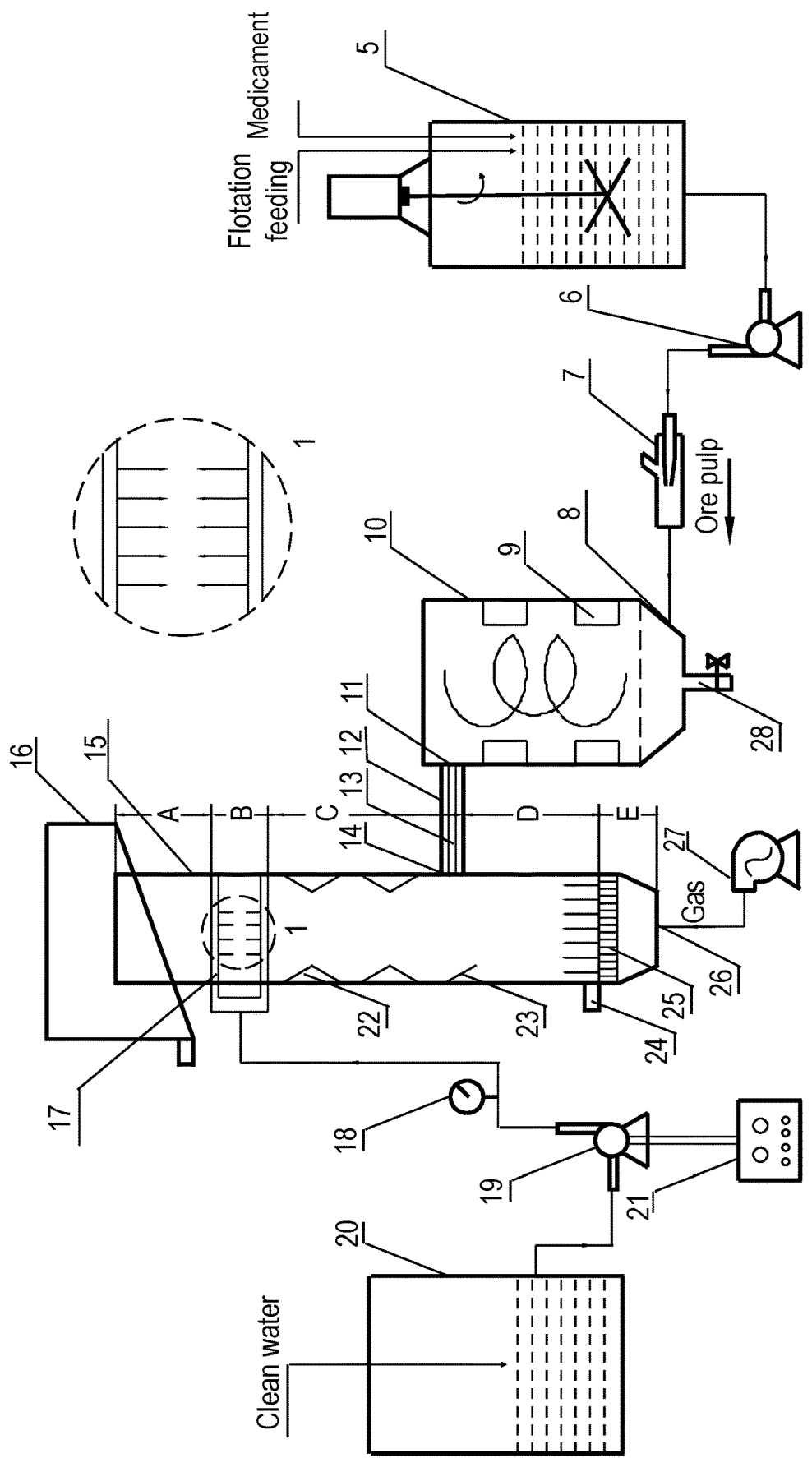
FIG. 2 is a schematic structural diagram of high-ash fine coal slime separation equipment according to the present invention.

As shown in FIG. 1 and FIG. 2, the high-ash fine coal slime separation equipment according to the present invention includes a feeding system 1, a mineralization system 2, a separation system 3 and a pulsating water flow control system 4 which are connected sequentially through pipelines, wherein the feeding system 1 includes a stirring barrel 5 with a stirring motor, wherein materials at a discharging port at the bottom of the stirring barrel 5 are pressurized by a pump 6 to be fed into the mineralization system 2;

the mineralization system 2 includes a bubble generator 7, a mineralization chamber 10 and a turbulent-flow dissipation pipe 12, wherein an inlet of the bubble generator 7 is connected to an outlet pipeline of the pump 6, and an outlet of the bubble generator 7 is connected to a feeding port below the mineralization chamber 10; a cylinder body of the mineralization chamber 10 is a cyclone shell, multiple layers of damping disks 9 are arranged in the mineralization chamber 10, a feeding port 8 tangent to the mineralization chamber 10 is formed in a middle lower part of the mineralization chamber 10, an accident discharging pipe 28 with a control valve is arranged on a lower part of the mineralization chamber 10, and a mineralization chamber discharging port 11 tangent to the mineralization chamber 10 is formed in an upper part of the mineralization chamber 10;

the separation system 3 includes a damping pulsating water flow type flotation column and an air compressor 27, wherein the damping pulsating water flow type flotation column 15 is of a columnar structure, an air inlet 26 connected to an outlet of the air compressor 27 is formed at the bottom of the damping pulsating water flow type flotation column 15, and a clean coal overflow tank 16 is arranged at the top of the damping pulsating water flow type flotation column 15;

the pulsating water flow control system 4 comprises a water tank 20, a variable-frequency pump 19, a PID control cabinet 21 and a pressure gauge 18, wherein a water outlet of the water tank 20 is connected to an inlet of the variable-frequency pump 19, an outlet of the variable-frequency pump 19 is connected to the separation system 3 through a pipeline, the pressure gauge 18 is arranged on a pipeline between the variable-frequency pump 19 and the separation system 3, and the PID control cabinet 21 is in circuit connection to the variable-frequency pump 19 and controls work of the variable-frequency pump 19; and the damping pulsating water flow type flotation column 15 is of a column-structure and is internally divided into a clean coal concentration region A, an active pulse flow region B, a damping pulsation region C, an air flotation scavenging region D and an inflation chamber E, wherein the clean coal concentration region A is the clean coal overflow tank 16 arranged at the top end of the columnar structure, the active pulse flow region B includes an annular pulsating water flow pipe 17 surrounding the damping pulsating water flow type flotation column 15, the annular pulsating water flow pipe 17 is provided with a plurality of jet orifices to enable clean water to uniformly wash a foam layer in the separation process so as to effectively reduce mechanical covering phenomenon and reduce the ash content of clean coal, a flotation column feeding port 14 is formed in a connecting portion of the damping pulsation region C and the air flotation scavenging region D, the damping pulsation region C is provided with a plurality of damping blocks 22 on an inner side wall of the damping pulsating water flow type flotation column 15, the damping blocks 22 are of triangular structures and are uniformly arranged at the periphery of the damping pulsation region C in a shell of the damping pulsating water flow type flotation column 15, an upper part of the air flotation scavenging region D is provided with a flotation assisted baffle 23 inclining downwards at a position of a surface opposite to the flotation column feeding port 14, an included angle between the flotation assisted baffle 23 and damping pulsating water flow type flotation column 15 is 15° to 60°, the flotation assisted baffle 23 prevents ore pulp from entering the damping pulsating water flow type flotation column 15 to directly collide with the opposite column wall so as to reduce the desorption probability of coarse particles and improve flotation stability, an lower part of the air flotation scavenging region D is provided with a tail coal opening 24 on a side wall, the bottom of the inflation chamber E is connected to an inlet of the air compressor 27, one or more layers of microporous ceramic plates 25 are arranged between the top of the inflation chamber E and the air flotation scavenging region D, the microporous ceramic plate has a pore diameter of 5 μm to 100 μm, and in the separation process, the microporous ceramic plate generates a large number of microbubbles by input air and prevents an ore pulp solution in the damping pulsating water flow type flotation column 15 from entering the air compressor.

Figure 3:
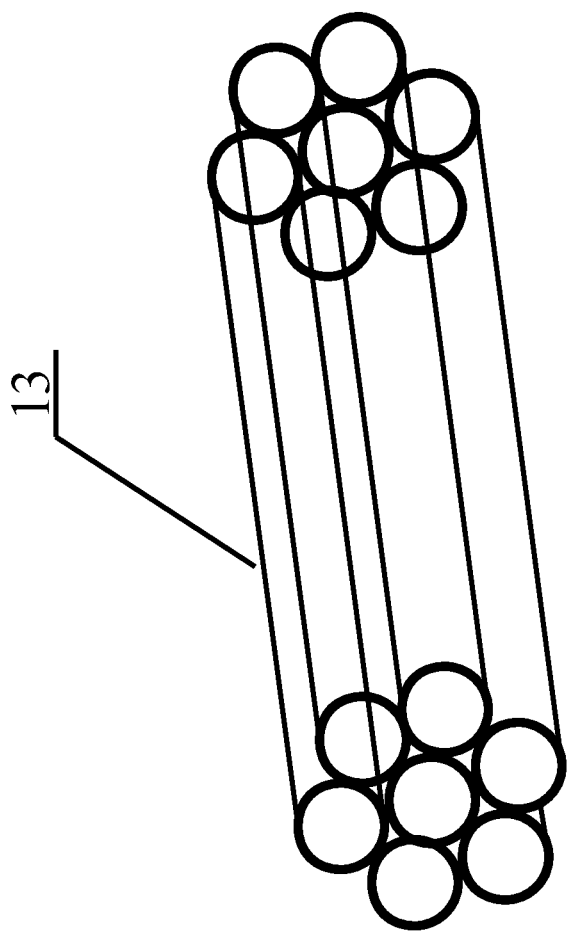
FIG. 3 is a schematic structural diagram of a turbulent-flow dissipation pipe of high-ash fine coal slime separation equipment according to the present invention.

A high-ash fine coal slime separation method includes the following steps:

a. the air compressor 27 is started and the damping pulsating water flow type flotation column 15 is inflated by the microporous ceramic plate 25; the variable-frequency pump 19 is started and a frequency of the variable-frequency pump 19 is adjusted by the PID control cabinet 21 so as to adjust a pulsating water flow frequency and an amplitude: the higher the content of high ash in the coal slime is, the greater the pulsating water frequency and the amplitude are, on the contrary, the smaller the pulsating water flow frequency and the amplitude; the accident discharging pipe 28 of the mineralization chamber 10 is closed;

b. flotation coal slime and medicaments are fed into the stirring barrel 5 to mix uniformly to generate an ore pulp mixture, the ore pulp is fed into the bubble generator 7 under the effect of the pump 6, the ore pulp mixture sucks air under a negative pressure generated under the jet flow action of the bubble generator 7 and the air is crushed to be mixed into the ore pulp mixture to form jet ore pulp;

c. the jet ore pulp continuously moves downwards to the mineralization chamber 10, a strong turbulent flow effect is generated under the action of a centrifugal force field of the mineralization chamber and the damping disk 9, efficient collision and adhesion between particles and bubbles in the jet ore pulp are conducted to form a gas-solid-liquid three-phase ore pulp body, the three-phase ore pulp body is discharged from the mineralization chamber discharging port 11, the discharged three-phase ore pulp body enters the turbulent-flow dissipation pipe 12 and then enters the damping pulsating water flow type flotation column 15 from the flotation column feeding port 3 after vortex in the three-phase ore pulp is eliminated by a plurality of small steel pipes 13 in the turbulent-flow dissipation pipe 12; as shown in FIG. 3, a turbulent-flow dissipation pipe 12 is arranged between the mineralization chamber discharging port 11 of the mineralization chamber 10 and the flotation column feeding port 14 of the damping pulsating water flow type flotation column 15, the turbulent-flow dissipation pipe 12 internally includes a plurality of steel pipes 13, the steel pipes 13 are welded into a bundle in pairs, a cross section of the bundle is quasi-circular, and each of the steel pipes 13 has a diameter of 5 mm to 6 mm and a length of 15 mm to 25 mm.

d. static separation is conducted after the three-phase ore pulp enters the damping pulsating water flow type flotation column 15, a flow velocity of the ore pulp is changed when the ore pulp passes through the damping block, one part of coarse clean coal in the ore pulp successfully enters the active pulse flow region B and the clean coal concentration region a, and high-ash materials are removed from the foam product generated in the three-phase ore pulp through the action of the pulsating water flow of the pulsating water flow pipe 17; particles in the three-phase ore pulp which are not mineralized and desorbed serve as coal particles difficult to separate to enter the air flotation scavenging region D and secondary mineralization is conducted with microbubbles generated by the microporous ceramic plate 25 to form a secondary mineralized foam product, thus enhancing recovery of the coal particles difficult to separate; and e. finally clean coal foam and coarse clean coal overflow together to enter the clean coal overflow tank 16 to be discharged, wherein mineralized particles and high-ash materials become underflow, and the underflow serves as the final tail coal to be discharged from the tail coal opening 24 of the damping pulsating water flow type flotation column 15.

Embodiment 1 a. the air compressor 27 is started and the damping pulsating water flow type flotation column 15 is inflated by the microporous ceramic plate 25; the variable-frequency pump 19 is started and a frequency of the variable-frequency pump 19 is adjusted by the PID control cabinet 21 so as to adjust a pulsating water flow frequency and an amplitude; the accident discharging pipe 28 of the mineralization chamber 10 is closed;

b. flotation coal slime and medicaments are fed into the stirring barrel 5 to mix uniformly, the mixture is fed into the bubble generator 7 by the pump 6, the mixture sucks air under a negative pressure generated under the jet flow action, and the air is crushed into microbubbles;

c. the jet ore pulp containing bubbles, water and ore particles continuously moves downwards to the mineralization chamber 10, and a strong turbulent flow effect is generated under the action of a centrifugal force field of the mineralization chamber 10 and the damping disk 9 to realize efficient collision and adhesion between particles and bubbles; the three-phase ore pulp system passing through a mineralization unit is discharged from the discharging port 11 of the mineralization chamber 10 and enters the damping pulsating water flow type flotation column 15 after large vortex inside is eliminated by the turbulent-flow dissipation pipe 12;

d. static separation is conducted after the ore pulp enters the damping pulsating water flow type flotation column 15, a flow velocity of the ore pulp is changed when the ore pulp passes through the damping block, one part of coarse clean coal successfully enters the active pulse flow region and the clean coal concentration region, and the foam product is subjected to forcible ash reduction through the action of the pulsating water flow of the pulsating water flow pipe 17; and the unmineralized and desorbed particles enter the air flotation scavenging region to perform secondary mineralization to enhance recovery; and e. finally clean coal foam and coarse clean coal overflow together to enter the clean coal overflow tank 16 to be discharged, wherein the underflow in the air flotation scavenging region serving as tail coal is discharged from the discharging port 24 of the damping pulsating water flow type flotation column 15.

What is claimed is:

1. A high-ash fine coal slime separation equipment, comprising a feeding system, a mineralization system, a separation system and a pulsating water flow control system which are connected sequentially through pipelines, wherein the feeding system comprises a stirring barrel with a stirring motor on top, wherein materials at a discharging port at the bottom of the stirring barrel are pressurized by a pump to be fed into the mineralization system;

the mineralization system comprises a bubble generator, a mineralization chamber and a turbulent-flow dissipation pipe, wherein an inlet of the bubble generator is connected to an outlet pipeline of the pump, and an outlet of the bubble generator is connected to a feeding port below the mineralization chamber;

the separation system comprises a damping pulsating water flow type flotation column and an air compressor, wherein the damping pulsating water flow type flotation column is of a columnar structure, an air inlet connected to an outlet of the air compressor is formed at a bottom of the damping pulsating water flow type flotation column, and a clean coal overflow tank is arranged at the top of the damping pulsating water flow type flotation column;

the pulsating water flow control system comprises a water tank, a variable-frequency pump, a PID control cabinet and a pressure gauge, wherein a water outlet of the water tank is connected to an inlet of the variable-frequency pump, an outlet of the variable-frequency pump is connected to the separation system through one of the pipelines, the pressure gauge is arranged on the one of the pipelines between the variable-frequency pump and the separation system, and the PID control cabinet is in circuit connection to the variable-frequency pump and controls work of the variable-frequency pump;

wherein the damping pulsating water flow type flotation column is of a column-structure and is internally divided into a clean coal concentration region, an active pulse flow region, a damping pulsation region, an air flotation scavenging region and an inflation chamber; wherein the clean coal concentration region is the clean coal overflow tank arranged at a top end of the columnar structure, the active pulse flow region comprises an annular pulsating water flow pipe surrounding the damping pulsating water flow type flotation column, the annular pulsating water flow pipe is provided with a plurality of jet orifices to enable clean water to uniformly wash a foam layer in the separation process so as to effectively reduce mechanical covering phenomenon and reduce an ash content of clean coal, a flotation column feeding port is formed in a connecting portion of the damping pulsation region and the air flotation scavenging region, the damping pulsation region is provided with a plurality of damping blocks on an inner side wall of the damping pulsating water flow type flotation column, the damping blocks are of triangular structures and are uniformly arranged at a periphery of the damping pulsation region in a shell of the damping pulsating water flow type flotation column, an upper part of the air flotation scavenging region is provided with a flotation assisted baffle inclining downwards at a position of a surface opposite to the flotation column feeding port, the flotation assisted baffle prevents ore pulp from entering the damping pulsating water flow type flotation column to directly collide with an opposite column wall so as to reduce a desorption probability of coarse particles and improve flotation stability, an lower part of the air flotation scavenging region is provided with a tail coal opening on a side wall, a bottom of the inflation chamber is connected to an inlet of the air compressor, and one or more layers of microporous ceramic plates are arranged between a top of the inflation chamber and the air flotation scavenging region.

2. The high-ash fine coal slime separation equipment according to claim 1, wherein an included angle between the flotation assisted baffle and the damping pulsating water flow type flotation column is 15° to 60°.

3. The high-ash fine coal slime separation equipment according to claim 1, wherein the microporous ceramic plate has a pore diameter of 5 μm to 100 μm; and in the separation process, the microporous ceramic plate generates a large number of microbubbles by input air and prevents an ore pulp solution in the damping pulsating water flow type flotation column from entering the air compressor.

4. The high-ash fine coal slime separation equipment according to claim 1, wherein a cylinder body of the mineralization chamber is a cyclone shell, wherein multiple layers of damping disks are arranged in the mineralization chamber, a feeding port tangent to the mineralization chamber is formed in a middle lower part of the mineralization chamber, an accident discharging pipe with a control valve is arranged on a lower part of the mineralization chamber, and a mineralization chamber discharging port tangent to the mineralization chamber is formed in an upper part of the mineralization chamber.

5. The high-ash fine coal slime separation equipment according to claim 1, wherein the turbulent-flow dissipation pipe is arranged between a mineralization chamber discharging port of the mineralization chamber and the flotation column feeding port of the damping pulsating water flow type flotation column, the turbulent-flow dissipation pipe internally comprises a plurality of steel pipes, the steel pipes are welded into a bundle in pairs, a cross section of the bundle is quasi-circular, and each of the steel pipes has a diameter of 5 mm to 6 mm and a length of 15 mm to 25 mm.

6. A separation method using the high-ash fine coal slime separation equipment according to claim 1, comprising the following steps:

a. starting the air compressor and inflating the damping pulsating water flow type flotation column through the microporous ceramic plate; starting the variable-frequency pump and adjusting a frequency of the variable-frequency pump by the PID control cabinet so as to adjust a pulsating water flow frequency and an amplitude: the higher the content of high ash in the coal slime is, the greater the pulsating water frequency and the amplitude are, on the contrary, the smaller the pulsating water flow frequency and the amplitude are; closing an accident discharging pipe of the mineralization chamber;

b. feeding flotation coal slime and medicaments into the stirring barrel to mix uniformly to generate an ore pulp mixture, feeding the ore pulp into the bubble generator under an effect of the pump, enabling the ore pulp mixture to suck air under a negative pressure generated under a jet flow action of the bubble generator and crushing the air to be mixed into the ore pulp mixture to form jet ore pulp;

c. enabling the jet ore pulp to continuously move downwards to the mineralization chamber, generating a strong turbulent flow effect under an action of a centrifugal force field of the mineralization chamber and a damping disk, performing efficient collision and adhesion between particles and bubbles in the jet ore pulp to form a gas-solid-liquid three-phase ore pulp body, discharging the three-phase ore pulp body from a mineralization chamber discharging port, enabling the discharged three-phase ore pulp body to enter the turbulent-flow dissipation pipe and then enter the damping pulsating water flow type flotation column from the flotation column feeding port after eliminating vortex in the three-phase ore pulp by a plurality of small steel pipes in the turbulent-flow dissipation pipe;

d. performing static separation after the three-phase ore pulp enters the damping pulsating water flow type flotation column, changing a flow velocity of the ore pulp when the ore pulp passes through the damping block, enabling one part of coarse clean coal in the ore pulp to successfully enter the active pulse flow region and the clean coal concentration region, and acting on a foam product generated in the three-phase ore pulp through pulsating water flow of the pulsating water flow pipe to remove high-ash materials in the foam product; taking particles in the three-phase ore pulp which are not mineralized and desorbed as coal particles difficult to separate to enter the air flotation scavenging region and performing secondary mineralization with microbubbles generated by the microporous ceramic plate to form a secondary mineralized foam product, thus enhancing recovery of the coal particles difficult to separate; and e. finally enabling clean coal foam and coarse clean coal to overflow together to enter the clean coal overflow tank and be discharged, wherein mineralized particles and high-ash materials become underflow, and the underflow serves as a final tail coal to be discharged from the tail coal opening of the damping pulsating water flow type flotation column.

\* \* \* \* \*